March 26, 1957 J. GUÉRIN 2,786,816
METHOD OF REGENERATING ACTIVATED ALUMINA CONTAINING
ADSORBED MOISTURE AND CHLORINE
Filed Dec. 14, 1953
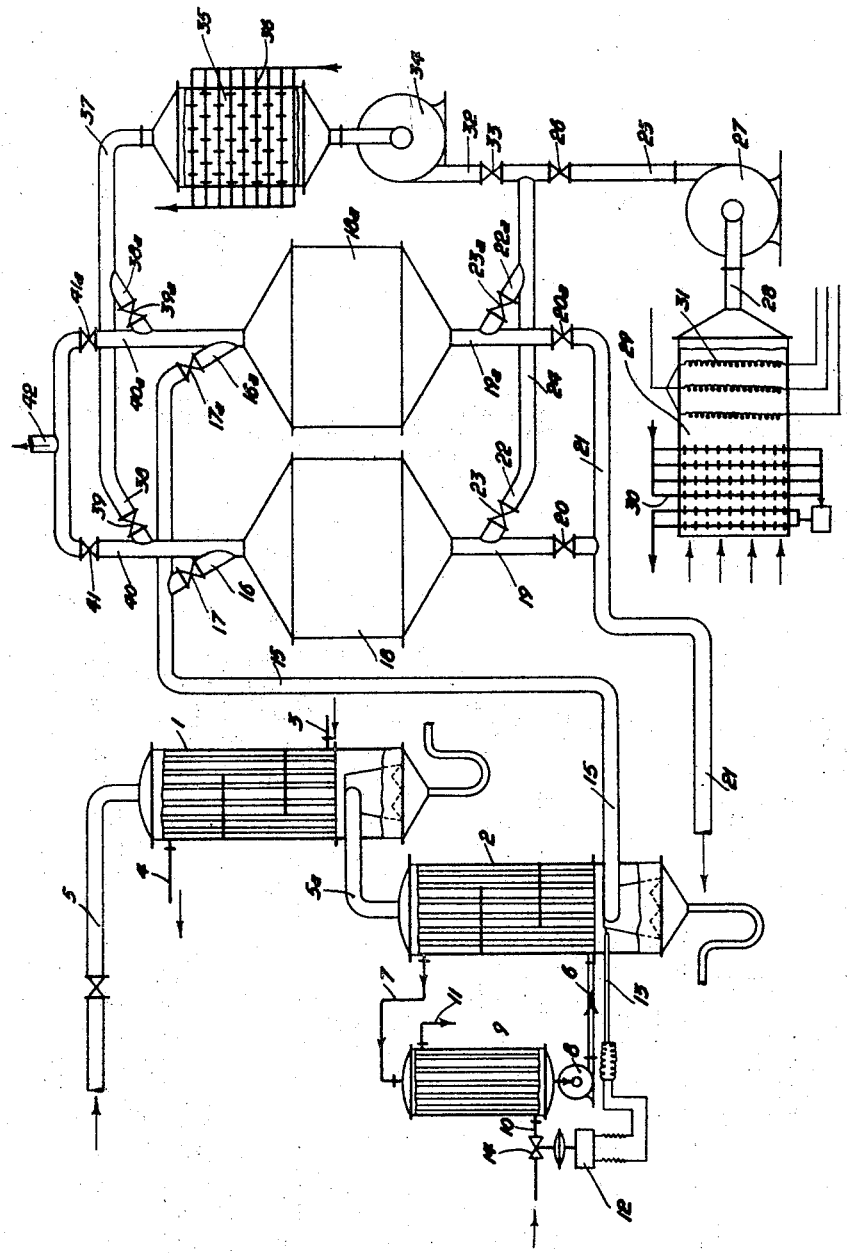
Jean Guérin
by
Webb, Mackey & Bender
Attys.

United States Patent Office 2,786,816
Patented Mar. 26, 1957

2,786,816

METHOD OF REGENERATING ACTIVATED ALUMINA CONTAINING ADSORBED MOISTURE AND CHLORINE

Jean Guérin, Jarrie, France, assignor to Societe d'Electro-Chimie, d'Electro-Metallurgie et des Acieries Electriques d'Ugine, Paris, France, a corporation of France Application December 14, 1953, Serial No. 398,182

Claims priority, application France December 18, 1952

1 Claim. (Cl. 252—411)

The present invention relates to the operation of drying moist chlorine by causing it to contact activated alumina and it more particularly relates to the regeneration of this activated alumina after the latter has been saturated with moisture.

It is known that the drying of moist chlorine and, more particularly of chlorine issuing from electrolysis cells is generally industrially effectuated by passing the chlorine through towers and introducing sulphuric acid either in the form of streams of liquid or as a spray into the towers.

Activated alumina has been suggested as a drying agent, but the method does not seem to have been retained since alumina has proved to be gradually deactivated, because of the adsorbed water and chlorine attacking the alumina at the time of the regeneration of the alumina, which generally is done by passing a current of hot air through the mass of alumina. After a restricted number of drying-regenerating cycles, the charge of activated alumina must be renewed and the method becomes expensive and, more particularly, more expensive than the drying operations with sulphuric acid, when considering both the cost of the alumina and the heat required to regenerate it.

The present invention makes it possible to remedy this disadvantage and, on the contrary, to render the drying of chlorine with activated alumina less expensive than the drying with sulphuric acid.

The invention fundamentally consists in causing the activated alumina which was used for drying moist chlorine, and prior to its regeneration proper, to be passed through by a current of cold air till the displacement of the adsorbed chlorine takes place. One thus avoids the further presence of the hot and moist chlorine which would deteriorate the alumina during its regeneration and it is possible to use the same charge of alumina almost indefinitely.

Under these conditions, the method for drying chlorine with activated alumina is less expensive than the method using sulphuric acid, as soon as the number of cycles exceeds twenty. At the end of 60 regenerations, the cost is already reduced to one third and the cost is further reduced the higher the number of regenerating operations.

It is also more efficacious than the method using sulphuric acid, since one succeeds, by drying chlorine with activated alumina and regenerating the alumina in accordance with the invention, in lowering the water content of the chlorine to 10 to 20 parts of water per one million parts of chlorine against 70 to 90 parts water per one million parts chlorine in an acid atomizing plant and 130 to 150 parts water per one million parts chlorine in the dripping towers.

Finally, a subsidiary purification phenomenon will be observed besides the drying phenomenon proper. The organic impurities of the chlorine are adsorbed by the alumina and desorbed with a partial decomposition at the time of the regeneration.

The method in accordance with the invention may be carried out in apparatus such as that which is diagrammatically shown by way of example in the accompanying drawing.

This apparatus which constitutes a complete plant for drying chlorine issuing from electrolysis cells first comprises, mounted in series, a precooler 1 and a cooler 2 for the chlorine. The precooler 1, the cooling of which is insured through a circulation of cold water entering at 3 and issuing at 4, is connected to an inlet piping 5 for the moist chlorine and, through a piping 5a, with the cooler 2. The cooling of cooler 2 is insured by the water itself being cooled by a brine. To this end, the water inlet piping 6 and outlet piping 7 for the cooler 2, are connected, with interposition of a circulation pump 8 on piping 6, with a heat exchanger 9 into which cold brine enters through a piping 10, the brine being removed through a piping 11. A thermostat 12, controlled through a thermo-element 13 immersed in the outlet side of the cooler 2, is arranged in order to regulate the opening of an inlet valve 14 interposed in the piping 10, for the brine.

A piping 15 connects the base of the cooler 2, through two branch pipes 16 and 16a in which valves 17 and 17a respectively are interposed, with two drying towers 18 and 18a lined inside with a chlorine resisting lining preferably in the form of a brick-work and filled with 1.5 cubic meters of activated alumina which is arranged so as to allow the circulation, in contact therewith, of the cooled chlorine arriving through piping 15. The lower part of these towers is connected through pipe branches 19 and 19a, in which valves 20 and 20a respectively are interposed, with a piping 21 for the outlet of the dry chlorine.

Ending at the base of the towers 18 and 18a are also pipe branches 22 and 22a which include valves 23 and 23a and which are connected to a piping 24 connected through a T-shaped connection to two pipings 25 and 32. Piping 25 is provided with a valve 26 and leads to the discharge side of a fan 27 which draws air, through a piping 28, through an air chamber 29 provided with a steam heating circuit 30 and/or with an electric heating device 31. Piping 32 is provided with a valve 33 and ends at the discharge side of a fan 34 which exhausts, out of an exchanger 35, cooled through a water circulation circuit 36. Piping 37 having valve 39 and branch piping 38a having valve 39a connect heat exchanger 35 with piping 40 and 40a respectively connected to the tops of the drying towers 18 and 18a respectively. The piping 40 and 40a are provided with valves 41 and 41a respectively and are connected to a drain piping 42.

The apparatus is operated as follows:

Valves 17 and 20 are first opened, all the other valves being closed and the moist chlorine issuing from electrolysis cells and containing, according to the surrounding temperature 10,000 to 20,000 parts of water for one million parts of chlorine, is fed through piping 5 at the rate of 5 to 7 cubic meters per minute. The chlorine is cooled in passing through the unit precooler 1 and cooler 2, thermostat 12 being set in order to control the opening of the valve 14 and, accordingly, the quantity of brine passing through exchanger 9 so that the cooling water in cooler 2 is brought to a temperature of the order of 8 to 9° C. in order that the temperature of the chlorine at the outlet from cooler 2 is about 10 to 12° C.

The chlorine which then shows a constant moisture which is of the order of 3,000 parts of water for one million parts of chlorine, passes through tower 18 in which the activated alumina adsorbs the moisture of the chlorine as well as the organic impurities contained therein, the purified chlorine being removed through piping 21 with a moisture content of 10 to 20 parts of water for one million parts of chlorine.

The zone which is saturated with moisture sinks little by little in the tower 18 and, after 24 hours and before the "breaking down" point—i. e. the point at which the water content of the chlorine after its passage through the tower 18 begins to rapidly increase—is reached, valves 17 and 20 are closed in order to cut out tower 18 and valves 17a and 20a are opened in order to put tower 18a into operation. Thus a safety margin is insured and the alumina is economically used while remaining below the breaking-down capacity, whereafter one proceeds to the regeneration of the alumina contained in tower 18.

To this end, without putting into action the heating devices 30 and/or 31 of chamber 29, valves 26, 23 and 41 are opened and fan 27 is started. Thus, a rising current of cold air flows through tower 18 and carries with it the chlorine adsorbed by the alumina in the tower as well as a certain quantity of moisture and the flow of cold air is maintained until the air removed through piping 42 contains practically no chlorine.

As soon as the chlorine and a part of the moisture have been thus desorbed, the heating devices of air chamber 29 are put into action in order to progressively raise the temperature of the air up to 200–220° C. This heated air vaporizes the water adsorbed by the alumina and regenerates the latter while partially decomposing and desorbing the formerly adsorbed impurities. In the course of this operation, the temperature of the mass of alumina and the temperature of the air at the outlet 42 rise little by little and the regeneration may be considered completed when the temperature of air at the outlet of tower 18 is within the range of 10 to 20° C. lower than that of the air at the inlet into said tower. The duration of the regenerating operation is of the order of 4 to 6 hours.

The hot air circuit is then interrupted, the valves 26 and 41 are closed and valves 33 and 39 are opened while fan 34 is started, which makes it possible to cause a current of dry air, which is cooled at each passage through exchanger 35, to flow in a closed circuit through the body of alumina in tower 18. As soon as the temperature reaches 30° C. in tower 18, valves 33, 23 and 39 are closed and said tower is again available for a drying cycle of moist chlorine. The duration of the cooling operation is about 2 to 4 hours.

It may be easily understood that after tower 18a has been operating for 24 hours as an adsorber, it is cut out of operation and tower 18 is simultaneously put into action while the alumina content of said tower 18a is regenerated by a process similar to that already described. In regenerating the alumina in tower 18a, valves 26, 23a and 41a and then valves 33 and 39a are actuated in the same manner and in the same order as valves 26, 23 and 41 and then valves 33 and 39 are actuated in regenerating the alumina in tower 18.

What I claim is:

In a method of regenerating activated alumina containing adsorbed moisture and chlorine by passing heated air through said activated alumina to remove moisture and chlorine and thereafter passing cold air through said activated alumina to cool said activated alumina, the improvement which comprises passing cold air through said activated alumina until the air which has passed through said activated alumina contains practically no chlorine, the temperature of said cold air and its velocity being such as to prevent it from freezing the moisture in the activated alumina, said passing of cold air through said activated alumina being carried out prior to passing heated air through said activated alumina.

References Cited in the file of this patent

UNITED STATES PATENTS

| | | |
|---|---|---|
| 905,602 | Sperry | Dec. 1, 1908 |
| 1,906,917 | Peters et al. | May 2, 1933 |
| 2,240,668 | Reed | May 6, 1941 |
| 2,535,902 | Dailey et al. | Dec. 26, 1950 |
| 2,661,808 | Kahle | Dec. 8, 1953 |

FOREIGN PATENTS

| | | |
|---|---|---|
| 229,334 | Great Britain | Nov. 12, 1925 |